R. FORWARD.
Improvement in Exercising-Lifts.
No. 4,999. Reissued July 23, 1872.
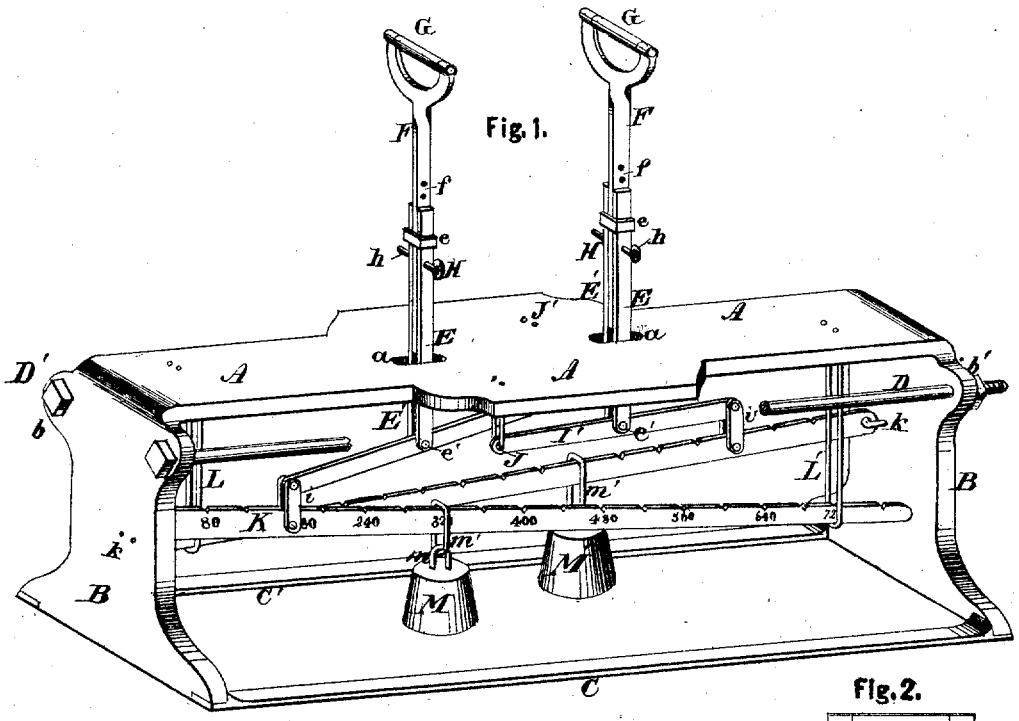
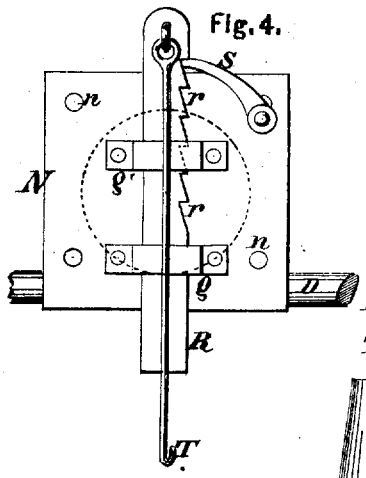
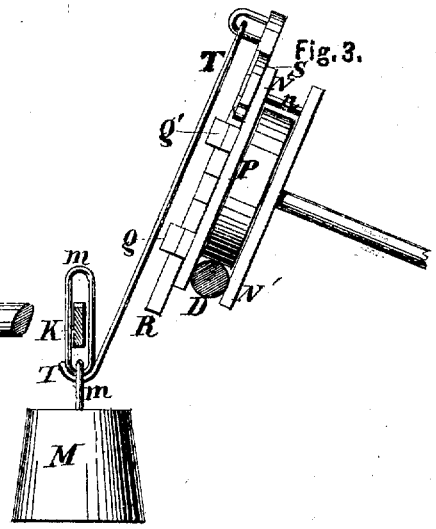
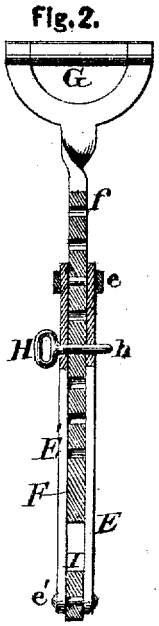
Witnesses.
Jas. L. Ewin
Walter Allen
Inventor.
Ross Forward
By Knight Bros.
Attorneys
AM. PHOTO-LITHOGRAPHIC CO. N.Y. (OSBORNE'S PROCESS.)

UNITED STATES PATENT OFFICE.

ROSS FORWARD, OF CINCINNATI, OHIO.

IMPROVEMENT IN EXERCISING-LIFTS.

Specification forming part of Letters Patent No. 126,796, dated May 14, 1872; reissue No. 4,999, dated July 23, 1872.

Specification of an Improved Exercising Apparatus, invented by ROSS FORWARD, of Cincinnati, in the county of Hamilton and State of Ohio.

*Nature and Objects of the Invention.*

This invention relates to that class of exercising apparatus commonly known as "health-lifts;" and the first part of my improvements consists in providing such machines with two similar weights that can be separately shifted upon graduated scale-beams in such a manner as to be adapted to the strength of either arm or hand without disturbing the equilibrium of the user, and thereby insure an equal and symmetrical development of all the muscles of the body. The second part of my improvements relates to a carriage that is so arranged as to transfer the weights along the scale-beam in either direction, which appliance enables women or children to adjust the machine in a few minutes so as to be exactly suited to their wants.

*General Description.*

Figure 1 is a perspective view of my improved exercising apparatus. Fig. 2 is a longitudinal section through one of the adjustable lifting-handles. Fig. 3 is a side elevation of the carriage that is employed for shifting the weights along the scale-beams, and Fig. 4 is a rear elevation of said carriage.

A represents the bench or platform upon which the operator stands, and said bench is supported at its ends upon legs B B′, which are united by stretchers C C′. The platform proper is pierced with two longitudinal slots, *a a′*, through which pass the lifting-handles, that are arranged as follows: The lower portion of each handle consists of two flat bars, E E′, whose upper ends are united by a collar, *e*, which serve as guides to the inner rods F. The rods F are provided at their upper ends with suitable handles G, and they are also perforated, as at *f*, for the reception of pins H, which pass through apertures *h* in the outer bars E E′. The lower ends of the bars E E′ are attached to levers I I′ by pivots *e′*, and said levers are fulcrumed to staples J J′, which are secured within the platform A. The free ends of levers I I′ are provided with links *i i′*, that serve to couple said levers with the scale-beams K K′, the latter being pivoted to the ends of the machine, as at K K′. Guides L L′, depending from the platform, serve to confine the scale-beams to a vertical path and prevent any lateral motion of the same. M M′ are shiftable weights having staples *m* for the attachment of links *m′*, wherewith said weights are suspended from their respective scale-beams. Projecting from the legs B B′ of the machine are lugs *b b′*, within which are secured stout cylindrical rods or tubes D D′, that not only strengthen the frame of the machine, but they also serve as tracks for the support of the carriage wherewith the weights are shifted. This carriage consists of two flat plates, N N′, that are secured a suitable distance apart by means of bars *n;* and said plates are provided with a lever or handle, O, upon which is journaled a roller, P. This roller is located between the plates N N′, as seen in Fig. 3, and said plates project beyond the roller so as to maintain the carriage in position upon either of the rods D D′. The rear plate N of the carriage is provided with guides Q Q′ for the reception of a bar, R, having ratchet-teeth *r*, with which latter is engaged a pawl or detent, S. The bar R carries a hook, T, for a purpose which will be hereinafter described.

*Operation.*

The operator first places the weights M M′ at suitable places upon the scale-beams K K′, and then adjusts the handles E F G so as to be of a convenient length, after which he mounts the platform and proceeds to exercise. By simply raising and lowering the handles G the weights M M′ are alternately elevated and depressed, and this effective and at the same time harmless method of exercising the muscles of the body can be continued at the pleasure of the operator. The duplex arrangement of handles, levers, and scale-beams permits the weights to be adjusted so as to develop both sides of the body equally; and in case a person should be weaker in one arm, as is generally the case, the weight on that side of the machine can be shifted toward the fulcrum of the scale-beam so as to be lifted with a less amount of exertion. In case women, children, or invalids should desire to shift the weights, they can readily do so by placing the carriage N N′ upon either of the bars D D′, and then adjust the rods R *r* so as to engage its hook T with the staple *m* of the weights. The operator then depresses the lever O, as shown in Fig. 3, and thus lifts the link *m′* from off the scale-beam K, in which elevated position the weight can be shifted by simply moving the carriage along the bar D. When the weight has reached the desired position the handle O is elevated and the weight deposited upon the scale-beam, after which the carriage is removed to the other side of the machine, and the remaining weight shifted in the same manner. As a matter of convenient reference, the scale-beams are marked so as to indicate the whole amount lifted.

Owing to the simplicity of its parts my machine can be constructed at a material reduction in cost, and thus placed within the reach of those who are debarred the use of the expensive ones heretofore employed.

It will be seen that my apparatus differs radically from those in which the weight to be lifted is that of the user himself, and that by means of my apparatus several persons are enabled (without change or adjustment of the apparatus) to compare and compete their lifting capacities, which cannot be done when the weight-resisting force varies with that of each user. It is also apparent that a separate and different adjustment of the two sets of levers does not act to disturb the equilibrium of the platform, nor to throw the operator out of the proper erect position, as would be done were the stress upon the two handles varied by separate adjustment of the fulcrum of levers connected with a movable platform on which the exerciser stands, and which separate adjustment, by forcing the exerciser to assume a side-leaning and distorted position in the act of lifting, would frustrate a fundamental object of the invention.

*Claims.*

I claim as my invention—

1. In combination with a stationary platform, the described arrangement of levers (one set for each hand) and separately-shiftable weights, whereby the user is enabled to exercise both hands in the manner set forth, with any equal or unequal resistance that may be desired.

2. The weight-carriage with its adjusting ratchet-bar R sliding in the boxes Q Q′, and provided with a hook, T, handle O, and pulley P, in combination with the guide-rod D, substantially as described.

In testimony of which invention I hereunto set my hand.

ROSS FORWARD.

Witnesses:
GEO. H. KNIGHT,
JAMES H. LAYMAN.